United States Patent [19]  
Araki et al.

[11] Patent Number: 4,739,005  
[45] Date of Patent: Apr. 19, 1988

[54] RUBBER COMPOSITIONS COMPRISING CARBON BLACK AND AN E-P BLOCK COPOLYMER

[75] Inventors: Shunzi Araki; Hiroshi Mouri, both of Kodaira, Japan

[73] Assignee: Bridgestone Corporation, Tokyo, Japan

[21] Appl. No.: 46,359

[22] Filed: May 6, 1987

[30] Foreign Application Priority Data

Apr. 15, 1987 [JP] Japan .................................. 62-90635

[51] Int. Cl.$^4$ ............................................... C08K 3/04
[52] U.S. Cl. ...................................... 524/496; 524/505
[58] Field of Search ................................ 524/496, 505

[56] References Cited

U.S. PATENT DOCUMENTS

| | | | |
|---|---|---|---|
| 4,328,133 | 5/1982 | Ogawa et al. | 524/505 |
| 4,398,582 | 8/1983 | Yuto et al. | 524/496 |
| 4,433,094 | 2/1984 | Ogawa et al. | 524/496 |
| 4,477,621 | 10/1984 | Sato et al. | 524/496 |
| 4,478,973 | 10/1984 | Misono et al. | 524/496 |
| 4,500,672 | 2/1985 | Suzuki et al. | 524/496 |
| 4,548,980 | 10/1985 | Nagata et al. | 524/496 |
| 4,550,135 | 10/1985 | Iwama et al. | 524/496 |
| 4,644,988 | 2/1987 | Ahmad et al. | 524/496 |

Primary Examiner—Herbert J. Lilling  
Attorney, Agent, or Firm—Sughrue, Mion, Zinn, Macpeak & Seas

[57] ABSTRACT

A rubber composition having improved resistance to crack growth and cut resistance comprises 1~15 parts by weight of a resin composed mainly of propylene-ethylene block copolymer based on 100 parts by weight of rubber ingredient, and particular amount of carbon black having specified iodine absorption value and DBP oil absorption.

6 Claims, No Drawings

RUBBER COMPOSITIONS COMPRISING CARBON BLACK AND AN E-P BLOCK COPOLYMER

BACKGROUND OF THE INVENTION

1. Field of the Invention

This invention relates to rubber compositions having improved resistance to crack growth and cut resistance when being repeatedly subjected to relatively large strain. More particularly, it relates to rubber compositions usable for general rubber articles such as tires, rubber hoses, industrial belts, rubber vibration isolators, marine fenders, shoe soles and so on.

2. Related Art Statement

Heretofore, there have been made many studies with respect to composite bodies each consisting of rubber and resin, a greater part of which is directed to plastics having an improved shock resistance by adding a small amount of rubber to a resin, while the study with respect to rubber compositions obtained by adding a small amount of a resin to a rubber ingredient is not attempted too much as apparent from the following reasons.

In general, the plastic is used under a strain region of less than about 10%, so that even if the adhesion strength between resin and rubber is not so high, the problem of causing fracture around the interface as a fracture nucleus is relatively little.

On the other hand, the rubber composition is usually used under a strain region extending to more than 100%, but the resin blended in the rubber ingredient is hardly distorted under such a region as compared with the rubber ingredient, so that stress concentration is caused in the interface between resin and rubber to rapidly reduce the fatigue life. Therefore, the actual use of rubber composition system consisting of a rubber ingredient as a sea portion and a small amount of a resin as an island portion is an exceptional case.

However, the study of such a rubber composition has hitherto been made from a viewpoint of the enhancement of service durability. For instance, it has been confirmed from U.S. Pat. No. 4,328,133 that the resistance to crack growth and cut resistance are improved by compounding polyisoprene rubber and/or natural rubber with a small amount of short fibers as a resin. In the short fiber-reinforced rubber composition, a resin wherein a glass transition temperature of its amorphous portion is outside the ordinary temperature range (30°~120° C.) is used as a material for the short fiber.

In the rubber composition of U.S. Pat. No. 4,328,133, the resistance to crack growth and cut resistance are certainly improved, but the anisotropy becomes undesirably too high. As a result, the improvement of these properties can not be attained in a certain direction. Furthermore, there is still a problem of causing stress concentration in the interface between rubber and resin to degrade the fatigue life.

SUMMARY OF THE INVENTION

It is, therefore, an object of the invention to provide rubber compositions having more improved resistance to crack growth and cut resistance and a largely prolonged fatigue life by reducing the anisotropy.

The inventors have made various studies in order to solve the aforementioned problems and noticed that only an isotactic polypropylene among many resins disclosed in U.S. Pat. No. 4,328,133 exhibits peculiarly excellent properties. Now, the inventors have made further studies with respect to the use of such a polypropylene and found that when a system simultaneously containing polypropylene and polyisoprene is subjected to a temperature history of not lower than 160° C., preferably not lower than 170° C., polypropylene and polyisoprene surprisingly react with each other to produce a primary bond (or chemical bond) at an interface therebetween. And also, it has been confirmed to cause no phenomenon when using polyolefins other than polypropylene.

Further, the inventors have made investigations with respect to the application of the above phenomenon to rubber industry and found out that when a small amount of polypropylene-ethylene block copolymer is added to rubber ingredient, the anisotropy of the resulting rubber composition lowers to greatly improve the bending durability and wear resistance, and as a result the invention has been accomplished.

According to the invention, there is the provision of a rubber composition comprising 1 to 15 parts by weight of a resin composed mainly of propylene-ethylene block copolymer having a propylene content of 80 to 95% by weight based on 100 parts by weight of rubber ingredient composed of natural rubber and/or synthetic diene rubber, and not less than 2.5 times per the weight of the resin of a carbon black having an iodine absorption value of not less than 40 mg/g and a DBP oil absorption of not less than 90 ml/100 g.

In a preferred embodiment of the invention, the propylene-ethylene block copolymer consists essentially of isotactic polypropylene and contains ethylene blocks from a viewpoint of the improvement of cut resistance.

In the rubber composition according to the invention, it is preferable that a ratio in modulus of elasticity at 100% elongation (higher value/lower value) when the tensile direction is changed by 90° is not more than 2.0 at maximum as a property after vulcanization.

DESCRIPTION OF THE PREFERRED EMBODIMENTS

According to the invention, the reason why the resin composed mainly of propylene-ethylene block copolymer is coexistent in the natural rubber and/or synthetic diene rubber is based on the fact that when this system is subjected to a temperature history of not lower than 160° C., preferably not lower than 170° C. during the kneading, the resin is fused and finely dispersed into the rubber ingredient in form of fiber by the shearing force of the kneader and at the same time the primary bond (chemical bond) is produced at the interface between rubber and polypropylene as previously mentioned to form a structure having a considerably high reinforcing action.

As the ethylene-propylene block copolymer, there may be considered many cases, which include, for example, a case wherein ethylene molecules are randomly distributed in the copolymer, a case wherein ethylene molecules are locally distributed in the copolymer at block or graft state, a case wherein ethylene molecules localized at block or graft state are randomly distributed in the copolymer and the like. Considering the localization degree in the random distribution of the localized ethylene molecule, there may be further considered various cases such as a case wherein the copolymer rapidly changes from polypropylene block to polyethylene block, a case wherein the ethylene molecule gradually increases, a case of considering the size of polyethylene crystal and a combination of these cases.

The inventors have vigorously continued the studies on each of these cases and found that the ethylene-propylene block copolymer according to the invention is preferably produced by introducing ethylene as a block in an amount of not less than 5%, preferably not less than 7% to polypropylene. Further, it is preferable that the change from polypropylene block to polyethylene block is made mild to produce a rubbery component (or a portion developing a rubbery elasticity by random distribution of propylene molecule and ethylene molecule) in an amount of not less than 5% per the resin. Because, an intermediate layer having a modulus of elasticity between "modulus of elasticity of rubber" and "modulus of elasticity of resin" is produced around the resin contained in the rubber composition, whereby the anisotropy of the rubber composition is reduced to enhance the fatigue life. In this connection, it has been found that when the modulus of elasticity in the intermediate layer is not less than two times that of rubber but not more than ½ that of resin, the fatigue durability is more improved as compared with that of the original rubber composition. Moreover, it has been confirmed that when the resin of propylene-ethylene block copolymer consists essentially of isotactic polypropylene and contains not less than 5% of the rubbery component obtained by randomly arranging propylene and ethylene, the highest properties are provided.

In the resin according to the invention, it is not preferable that the crystal of polypropylene as a main ingredient melts at a temperature usually used in the rubber composition, or it is difficult to produce the dispersion of resin into the rubber composition and the formation of primary bond to rubber when the polypropylene crystal does not melt in the kneading of unvulcanized rubber composition. Therefore, the melting point of polypropylene crystal in the industrially preferable polypropylene block portion is 155°~170° C. On the other hand, the melting point of polyethylene crystal in polyethylene block portion is lower than that of polypropylene crystal. Particularly, it is preferable that the temperature difference in the melting point between polypropylene crystal and polyethylene crystal is not lower than 5° C. Moreover, the melting point is measured by a differential scanning calorimetry (DSC) (temperature rising rate: 10° C./min).

According to the invention, the reason why the amount of carbon block is limited to not less than 2.5 times per the weight of the resin is due to the fact that when the amount of carbon black is too small, the resin is not sufficiently dispersed in the rubber, which can not produce a sufficient shearing stress in the kneading and does not so raise the temperature.

Furthermore, when using a carbon black having an iodine absorption value of less than 40 mg/g and a DBP oil absorption of less than 90 ml/100 g, it is difficult to sufficiently disperse the resin in the rubber composition, and also the wear resistance aiming at the invention is not sufficiently improved.

The rubber composition according to the invention has an anisotropy because polypropylene is oriented in form of fiber as previously mentioned. If the anisotropy is more than 2.0, it is difficult to use the rubber composition in industry, so that the anisotropy is restricted to not more than 2.0.

As a factor for largely determining the quality of the resin composed mainly of polypropylene according to the invention, there is a molecular weight of the resin generally evaluated by a melt flow index (MFI). In this connection, the inventors have made various studies and found that as the melt flow index becomes higher or the molecular weight becomes lower, the roll processability of the kneaded rubber composition is good and the anisotropy is low. However, when the melt flow index is too high, the remarkable effect of improving the resistance to crack growth and cut resistance is lost. Therefore, the melt flow index of the resin according to the invention is preferable to be not more than 30 g/10 minutes at 230° C. as measured according to JIS K7210. Under such MFI range, it should be attempted to simultaneously improve the processability and properties of the rubber composition.

According to the invention, the rubber composition may be compounded with proper amounts of additives such as sulfur as a vulcanizing agent, vulcanization accelerator, accelerator promoter, antioxidant, softening agent, filler and so on.

The following examples are given in illustration of the invention and are not intended as limitations thereof.

Four test resins composed mainly of propylene and having properties as shown in the following Table 1 were employed in the following examples and comparative examples.

TABLE 1

| Test resin *1 | 1 *2 | 2 | 3 | 4 |
| --- | --- | --- | --- | --- |
| MFI (g/10 min: 230° C.) | 5.0 | 0.7 | 30.0 | 30.0 |
| Ethylene ingredient (%) | 0 | 10 | 5 | 22 |
| Propylene ingredient (%) | 100 | 90 | 95 | 78 |
| Introduction of ethylene | — | block | block | block |
| Rubbery component | 0 | 12 | 8 | 28 |
| Melting point in polypropylene portion (°C.) | 160.5 | 161.5 | 160.5 | 156 |
| Anisotropy *3 | 2.31 | 1.53 | 1.57 | 1.38 |

*1 Each of test resins 1-4 is a polypropylene resin made by Mitsubishi Yuka K. K.
*2 Test resin 1 corresponds to polypropylene resin used in Example 1 of U.S. Pat. No. 4,328,133.
*3 Ratio in modulus of elasticity at 100% elongation (higher value/lower value) when the tensile direction of the rubber composition containing the test resin is changed by 90°.

EXAMPLE 1, COMPARATIVE EXAMPLES 1~5

Six rubber compositions were prepared by using the test resins 1 and 2 according to a compounding recipe (part by weight) shown in the following Table 2.

After each of these rubber compositions was vulcanized in the usual manner, the resistance to crack growth, cut resistance and toughness were evaluated by the following methods to obtain results as shown in Table 2.

(1) Resistance to crack growth

After a specimen of 60 mm×100 mm×1.0 mm was provided at its center with a scratch of 0.3 mm in length, it was subjected to an extension fatigue cracking test at an oscillation number of 300 cycle/min under a strain of 50%, during which a time till growth up to 20 mm was measured. The resistance to crack growth was determined by an index value according to the following equation on the basis that the value of control (Comparative Example 1) was 100.

Resistance to crack growth(index) = $\dfrac{\text{Time of control}}{\text{Time of test specimen}} \times 100$ The larger the numerical value, the better the resistance to crack growth.

(2) Cut resistance

A knife with an edge angle of 45° was impacted to the vulcanized rubber composition of 8 cm in thickness at a speed of 0.894 m/sec under an energy of 120 Joule to measure a depth of the resulting scratch. The cut resistance was evaluated by an index value of the measured depth in the same manner as in the resistance to crack growth. The larger the numerical value, the better the cut resistance.

(3) Toughness

The term "toughness" means an energy stored till the vulcanized rubber composition is broken. The toughness was determined by an area in a stress-strain curve of the vulcanized rubber composition after the tensile test. The toughness was evaluated by an index value in the same manner as in the resistance to crack growth. The larger the numerical value, the better the toughness.

TABLE 2

|  | Comparative Example 1 | Comparative Example 2 | Comparative Example 3 | Comparative Example 4 | Comparative Example 5 | Example 1 |
| --- | --- | --- | --- | --- | --- | --- |
| Natural rubber | 100 | 100 | 100 | 100 | 100 | 100 |
| Carbon black HAF *1 | 40 | 50 | 60 | 70 | 40 | 40 |
| Test resin 1 | — | — | — | — | 6 | — |
| Test resin 2 | — | — | — | — | — | 6 |
| Stearic acid | 2 | 2 | 2 | 2 | 2 | 2 |
| Santoflex 13 *2 | 1 | 1 | 1 | 1 | 1 | 1 |
| ZnO | 3 | 3 | 3 | 3 | 3 | 3 |
| Vulcanization accelerator NOBS *3 | 0.5 | 0.5 | 0.5 | 0.5 | 0.5 | 0.5 |
| Sulfur | 2.0 | 2.0 | 2.0 | 2.0 | 2.0 | 2.0 |
| Resistance to crack growth | 100 | 185 | 362 | 366 | 85 | 242 |
| Cut resistance | 100 | 194 | 330 | 445 | 325 | 285 |
| Toughness | 100 | 86 | 68 | 50 | 101 | 107 |

*1 Iodine absorption value = 82 mg/g DBP oil absorption = 102 ml/100 g
*2 Trade name of antioxidant made by Monsanto: N—(1,3-dimethyl-butyl)N'—phenyl-p-phenylenediamine
*3 N—oxydiethylene-2-benzothiazolesulfenamide In case of using natural rubber, it has been confirmed from the results of Table 2 that the rubber composition of Example 1 according to the invention exhibits very excellent properties as compared with the conventional rubber compositions.

EXAMPLE 2, COMPARATIVE EXAMPLES 6~10

Six rubber compositions were prepared by using the test resins 1 and 2 according to a compounding recipe as shown in the following Table 3.

Then, the resistance to crack growth, cut resistance and toughness were measured with respect to these rubber compositions by the same evaluation methods as described in Example 1 to obtain results as shown in Table 3.

TABLE 3

|  | Comparative Example 6 | Comparative Example 7 | Comparative Example 8 | Comparative Example 9 | Comparative Example 10 | Example 2 |
| --- | --- | --- | --- | --- | --- | --- |
| SBR-1500 *1 | 100 | 100 | 100 | 100 | 100 | 100 |
| Carbon black HAF | 40 | 50 | 60 | 70 | 40 | 40 |
| Test resin 1 | — | — | — | — | 6 | — |
| Test resin 2 | — | — | — | — | — | 6 |
| Stearic acid | 2 | 2 | 2 | 2 | 2 | 2 |
| Santoflex 13 | 1 | 1 | 1 | 1 | 1 | 1 |
| ZnO | 3 | 3 | 3 | 3 | 3 | 3 |
| Vulcanization accelerator DPG *2 | 0.4 | 0.4 | 0.4 | 0.4 | 0.4 | 0.4 |
| Vulcanization accelerator DM *3 | 0.6 | 0.6 | 0.6 | 0.6 | 0.6 | 0.6 |
| Sulfur | 1.5 | 1.5 | 1.5 | 1.5 | 1.5 | 1.5 |
| Resistance to crack growth | 100 | 165 | 251 | 296 | 92 | 201 |
| Cut resistance | 100 | 149 | 277 | 436 | 325 | 170 |
| Toughness | 100 | 91 | 84 | 70 | 100 | 103 |

*1 styrene-butadiene copolymer rubber
*2 diphenylguanidine
*3 dibenzothiazyldisulfide Although the rubber composition of Example 2 uses the synthetic rubber instead of natural rubber (Example 1), all properties are considerably improved as compared with the rubber composition of Comparative Example 6. Further, it can be seen from Table 3 that some properties in the rubber compositions of Comparative Examples 7-10 are poor as compared with the rubber composition of Comparative Example 6, which is not a true in Example 2. Of course, the invention is effective for a rubber blend because it is effective for natural rubber or synthetic rubber alone as shown in Examples 1 and 2. Moreover, as the synthetic rubber, use may be made of butadiene rubber (BR), ethylene-propylene-diene terpolymer rubber (EPDM), acrylonitrile-butadiene rubber (NBR), butyl rubber (IIR), chloroprene rubber (CR) and so on in addition to SBR.

EXAMPLES 3~5, COMPARATIVE EXAMPLES 11~12

Five rubber compositions were prepared by using the test resin 2 according to a compounding recipe as shown in the following Table 4. The properties of these rubber compositions were evaluated by the same methods as in Example 1 to obtain results as shown in Table 4.

Moreover, the results of Comparative Example 1 were used as a control in Table 4.

TABLE 4

|  | Comparative Example 11 | Example 3 | Example 4 | Example 5 | Comparative Example 12 |
|---|---|---|---|---|---|
| Natural rubber | 100 | 100 | 100 | 100 | 100 |
| Carbon black HAF | 40 | 40 | 40 | 40 | 40 |
| Test resin 2 | 0.5 | 1.5 | 10 | 15 | 20 |
| Stearic acid | 2 | 2 | 2 | 2 | 2 |
| Santoflex 13 | 1 | 1 | 1 | 1 | 1 |
| ZnO | 3 | 3 | 3 | 3 | 3 |
| Vulcanization accelerator NOBS | 0.5 | 0.5 | 0.5 | 0.5 | 0.5 |
| Sulfur | 2.0 | 2.0 | 2.0 | 2.0 | 2.0 |
| Resistance to crack growth | 101 | 181 | 286 | 121 | 81 |
| Cut resistance | 102 | 112 | 389 | 428 | 428 |
| Toughness | 100 | 103 | 101 | 93 | 65 |

As seen from the results of Table 4, the amount of the resin composed mainly of propylene-ethylene block copolymer should be within a range of 1 to 15 parts by weight per 100 parts by weight of rubber ingredient.

In the rubber composition of Comparative Example 12, the kneading processability is considerably poor to cause the poor dispersion.

EXAMPLES 6~11, COMPARATIVE EXAMPLES 11~24

In order to examine the effect of carbon black to be added to the rubber composition containing the test resin 2, various rubber compositions were prepared by using a carbon black as shown in the following Table 5 according to a compounding recipe as shown in the following Tables 6~8. Then, the properties of these rubber compositions were evaluated by the same methods as in Example 1 to obtain results as shown in Tables 6~8.

TABLE 5

|  | Iodine absorption value (mg/g) | DBP oil absorption (ml/100 g) |
|---|---|---|
| Carbon black SAF | 145 | 113 |
| Carbon black LS-ISAF | 118 | 78 |
| Carbon black HS-ISAF | 123 | 126 |
| Carbon black N-231 | 125 | 91 |
| Carbon black FEF | 43 | 121 |
| Carbon black GPF | 36 | 91 |

TABLE 6

|  | Comparative Example 13 | Comparative Example 14 | Comparative Example 15 | Example 6 | Comparative Example 16 | Example 7 |
|---|---|---|---|---|---|---|
| Natural rubber | 100 | 100 | 100 | 100 | 100 | 100 |
| Carbon black HAF | 12 | 12 | 18 | 18 | 60 | 60 |
| Test resin 2 | — | 6 | — | 6 | — | 6 |
| Aromatic oil | — | — | — | — | 10 | 10 |
| Stearic acid | 2 | 2 | 2 | 2 | 2 | 2 |
| Santoflex 13 | 1 | 1 | 1 | 1 | 1 | 1 |
| ZnO | 3 | 3 | 3 | 3 | 3 | 3 |
| Vulcanization accelerator NOBS | 0.8 | 0.8 | 0.7 | 0.7 | 0.5 | 0.5 |
| Sulfur | 2.0 | 2.0 | 2.0 | 2.0 | 2.0 | 2.0 |
| C/B ratio* | — | 2 | — | 3 | — | 10 |
| Resistance to crack growth | 100 | 63 | 100 | 476 | 100 | 185 |
| Cut resistance | 100 | 101 | 100 | 354 | 100 | 123 |
| toughness | 100 | 77 | 100 | 103 | 100 | 109 |

*C/B ratio : weight of carbon black/weight of resin composed mainly of propylene and ethylene

TABLE 7

|  | Comparative Example 17 | Example 8 | Comparative Example 18 | Comparative Example 19 | Comparative Example 20 | Example 9 |
|---|---|---|---|---|---|---|
| Natural rubber | 100 | 100 | 100 | 100 | 100 | 100 |
| Carbon black SAF | 40 | 40 | — | — | — | — |
| Carbon black LS-ISAF | — | — | 40 | 40 | — | — |
| Carbon black HS-ISAF | — | — | — | — | 40 | 40 |
| Test resin 2 | — | 6 | — | 6 | — | 6 |
| Aromatic oil | — | — | — | — | 10 | 10 |
| Stearic acid | 2 | 2 | 2 | 2 | 2 | 2 |
| Santoflex 13 | 1 | 1 | 1 | 1 | 1 | 1 |
| ZnO | 3 | 3 | 3 | 3 | 3 | 3 |
| Vulcanization accelerator NOBS | 0.8 | 0.8 | 0.7 | 0.7 | 0.5 | 0.5 |
| Sulfur | 2.0 | 2.0 | 2.0 | 2.0 | 2.0 | 2.0 |
| C/B ratio | — | 6.7 | — | 6.7 | — | 6.7 |
| Resistance to crack growth | 100 | 413 | 100 | 93 | 100 | 423 |
| Cut resistance | 100 | 352 | 100 | 207 | 100 | 317 |

TABLE 7-continued

|  | Comparative Example 17 | Example 8 | Comparative Example 18 | Comparative Example 19 | Comparative Example 20 | Example 9 |
|---|---|---|---|---|---|---|
| Toughness | 100 | 101 | 100 | 85 | 100 | 102 |

TABLE 8

|  | Comparative Example 21 | Example 10 | Comparative Example 22 | Comparative Example 23 | Comparative Example 24 | Example 11 |
|---|---|---|---|---|---|---|
| Natural rubber | 100 | 100 | 100 | 100 | 100 | 100 |
| Carbon black FEF | 40 | 40 | — | — | — | — |
| Carbon black GPF | — | — | 40 | 40 | — | — |
| Carbon black N-231 | — | — | — | — | 40 | 40 |
| Test resin 2 | — | 6 | — | 6 | — | 6 |
| Aromatic oil | — | — | — | — | 10 | 10 |
| Stearic acid | 2 | 2 | 2 | 2 | 2 | 2 |
| Santoflex 13 | 1 | 1 | 1 | 1 | 1 | 1 |
| ZnO | 3 | 3 | 3 | 3 | 3 | 3 |
| Vulcanization accelerator NOBS | 0.8 | 0.8 | 0.7 | 0.7 | 0.5 | 0.5 |
| Sulfur | 2.0 | 2.0 | 2.0 | 2.0 | 2.0 | 2.0 |
| C/B ratio | — | 6.7 | — | 6.7 | — | 6.7 |
| Resistance to crack growth | 100 | 315 | 100 | 124 | 100 | 221 |
| Cut resistance | 100 | 264 | 100 | 109 | 100 | 124 |
| Toughness | 100 | 107 | 100 | 83 | 100 | 101 |

As seen from the results of Tables 6~8, the excellent resistance to crack growth, cut resistance and toughness are obtained when a carbon black having an iodine absorption value of not less than 40 mg/g and a DBP oil absorption of not less than 90 ml/100 g is used in an amount of not less than 2.5 times per the weight of the resin composed mainly of propylene-ethylene block copolymer as shown in the rubber compositions of Examples 6-11. That is, it is necessary that the carbon black is used in an amount of not less than 2.5 times per the weight of the resin in the preparation of the rubber composition.

In the rubber compositions of Comparative Examples 14, 19 and 23, the kneading can not be well performed and the poor dispersion is caused.

EXAMPLES 12~13, COMPARATIVE EXAMPLES 25~27

In order to examine an influence of each of the test resins 1~4 on the resistance to crack growth, wear resistance, cut resistance and toughness of the rubber composition, five rubber compositions were prepared according to a compounding recipe as shown in the following Table 9. Then, the resistance to crack growth, cut resistance and toughness were evaluated by the same methods as in Example 1 and the wear resistance was evaluated by the following method to obtain results as shown in Table 9.

Wear resistance

The abrasion loss was measured by a Pico type abrading test (ASTM D2228-69) and an Akron type abrading test (load: 2.72 kg (6 lbs), angle: 15°, abrading number: 1,000 times), from which the wear resistance was evaluated by the following equation:

$$\text{Wear resistance(index)} = \frac{\text{Abrasion loss of control}}{\text{Abrasion loss of test piece}} \times 100$$

The larger the numerical value, the better the wear resistance.

TABLE 9

|  | Comparative Example 25 | Comparative Example 26 | Example 12 | Example 13 | Comparative Example 27 |
|---|---|---|---|---|---|
| Natural rubber | 80 | 80 | 80 | 80 | 80 |
| BR01* | 20 | 20 | 20 | 20 | 20 |
| Carbon black HAF | 40 | 40 | 40 | 40 | 40 |
| Test resin 1 | — | 6 | — | — | — |
| Test resin 2 | — | — | 6 | — | — |
| Test resin 3 | — | — | — | 6 | — |
| Test resin 4 | — | — | — | — | 6 |
| Stearic acid | 2 | 2 | 2 | 2 | 2 |
| Santoflex 13 | 1 | 1 | 1 | 1 | 1 |
| ZnO | 3 | 3 | 3 | 3 | 3 |
| Vulcanization accelerator NOBS | 0.7 | 0.7 | 0.7 | 0.7 | 0.7 |
| Sulfur | 1.5 | 1.5 | 1.5 | 1.5 | 1.5 |
| Anisotropy | 1.0 | 2.31 | 1.53 | 1.57 | 1.38 |
| C/B ratio | — | 6.7 | 6.7 | 6.7 | 6.7 |
| Resistance to crack growth | 100 | 87 | 226 | 173 | 214 |
| Wear resistance | 100 | 106 | 116 | 108 | 101 |
| Cut resistance | 100 | 332 | 254 | 175 | 143 |
| Toughness | 100 | 100 | 103 | 107 | 87 |

*butadiene rubber

In the test resins 2 and 3 used in Example 12 and 13, the propylene ingredient in the resin is within a range of 80~95% by weight. As seen from Table 9, the rubber compositions containing the above resin are excellent in all of the properties as compared with the rubber composition using a resin whose propylene content being outside the above range. Furthermore, it has been confirmed that the propylene-ethylene block copolymer is preferable to contain not less than 5% of a rubbery component randomly arranging ethylene and propylene. Moreover, it has been confirmed that the maximum value of a ratio in modulus of elasticity at 100% elongation (higher value/lower value) when the tensile direction is changed by 90° is preferable to be not more than 2.0 as a property after vulcanization.

As mentioned above, in the rubber compositions according to the invention, not only the resistance to crack growth and cut resistance when being repeatedly subjected to a relatively large strain are excellent, but also the fatigue life and wear resistance are largely improved by the reduction of anisotropy. Therefore, the rubber composition according to the invention are applicable for general rubber articles such as tire, rubber hose, industrial belt, rubber vibration isolator, marine fender, shoe sole and so on.

What is claimed is:

1. A rubber composition comprising 1 to 15 parts by weight of a resin composed mainly of propylene-ethylene block copolymer having a propylene content of 80 to 95% by weight based on 100 parts by weight of rubber ingredient composed of natural rubber and/or synthetic diene rubber, and not less than 2.5 times per the weight of the resin of a carbon black having an iodine absorption value of not less than 40 mg/g and a DBP oil absorption of not less than 90 ml/100 g.

2. The rubber composition according to claim 1, wherein said propylene-ethylene block copolymer consists essentially of isotactic polypropylene and contains ethylene blocks.

3. The rubber composition according to claim 2, wherein an amount of said ethylene block is not less than 5%, preferably not less than 7%.

4. The rubber composition according to claim 2, wherein said polypropylene is a crystal having a melting point of 155°–170° C.

5. The rubber composition according to claim 1, wherein said resin has a melt flow index of not more than 30 g/10 min at 230° C.

6. The rubber composition according to claim 1, wherein said composition has a maximum value of a ratio in modulus of elasticity at 100% elongation when tensile direction is changed by 90° being not more than 2.0 as a property after vulcanization.

* * * * *